United States Patent [19]
Slegers et al.

[11] Patent Number: 5,828,186
[45] Date of Patent: Oct. 27, 1998

[54] IGNITION SCHEME FOR A HIGH PRESSURE DISCHARGE LAMP

[75] Inventors: Frans Slegers; Hendrik J. Blankers; Nicolaas J. De Jong, all of Eindhoven, Netherlands

[73] Assignee: U.S. Philips Corporation, New York, N.Y.

[21] Appl. No.: 608,909

[22] Filed: Feb. 29, 1996

[30]     Foreign Application Priority Data

Mar. 1, 1995 [EP] European Pat. Off. .............. 95200498

[51] Int. Cl.$^6$ ............................ H05B 41/00; H05B 41/14
[52] U.S. Cl. ........................ 315/290; 315/289; 315/276; 315/DIG. 2
[58] Field of Search ..................................... 315/289, 290, 315/274, 209 CD, 239, 244, DIG. 7, 209 R, DIG. 5, 209 SC, 209 M, 276, DIG. 2

[56]             References Cited

U.S. PATENT DOCUMENTS

| | | | |
|---|---|---|---|
| 4,210,850 | 7/1980 | Britton | 315/290 |
| 4,403,173 | 9/1983 | Mayer | 315/289 |
| 4,414,600 | 11/1983 | Schweickardt | 361/56 |
| 4,749,914 | 6/1988 | Feher et al. | 315/246 |
| 4,958,107 | 9/1990 | Mattas et al. | 315/289 |
| 5,084,655 | 1/1992 | Van Zanten | 315/290 |
| 5,087,859 | 2/1992 | Blankers | 315/209 R |
| 5,387,845 | 2/1995 | Nilssen | 315/209 R |

FOREIGN PATENT DOCUMENTS 57-17513  12/1982  Japan .

*Primary Examiner*—Arnold Kinkead
*Attorney, Agent, or Firm*—Edward Blocker

[57]             ABSTRACT

A circuit arrangement for igniting a high pressure discharge lamp includes a secondary winding of a pulse transformer which is at least partially capacitively shunted forming a tuned filter. The tuned filter preferably forms a band pass filter for passing the second harmonic of the signal produced by a pulse generator. An increase in the supply of current during take-over results thereby minimizing the time required for ignition.

9 Claims, 2 Drawing Sheets

IGNITION SCHEME FOR A HIGH PRESSURE DISCHARGE LAMP

BACKGROUND OF THE INVENTION

The invention relates to a circuit arrangement for igniting a high-pressure discharge lamp, provided with input terminals for connection to a supply source; a pulse generating circuit having a natural frequency and provided with a voltage-dependent breakdown element; a pulse transformer; and an electrical connection between a secondary winding of the pulse transformer and lamp connection points.

Conventional starter circuits, such as disclosed in U.S. Pat. No. 5,087,859 are well known for starting a high-pressure discharge lamp within a projection TV system. Special requirements are imposed on a lamp suitable for such an application as to its dimensions and luminous efficacy. An ignition pulse of more than 10 kV, often even more than 20 kV, can be required for reliable lamp ignition. An ignition circuit is also required to quickly reignite an extinguished lamp which still may be hot. Such hot re-ignition requires a re-ignition pulse of an amplitude corresponding to that of the ignition pulse.

The voltage pulse in the pulse transformer is applied to the lamp connection points directly from the secondary winding.

Ignition pulse generation takes place in the known circuit arrangement by operating a tuned LC circuit near its resonance whereby the voltage across the capacitive element is increased until the breakdown voltage of the breakdown element is reached. For efficient operation, the supply source is commuted with a comparatively high frequency in the tens of kHz during the ignition pulse generating process. The natural frequency of the pulse generating circuit is the frequency of the tuned circuit formed by the primary winding of the pulse transformer and the resonant capacitive element of a voltage-raising network. After the lamp has ignited and a stable arc discharge has developed, the commutation frequency of the supply voltage switches to a comparatively low value. The lamp behaviour from breakdown up to the moment a stable discharge is achieved is called the ignition phase. The choice of a high commutation frequency in the ignition phase renders possible the use of comparatively small components, while the generation of a sufficiently high voltage will take up comparatively little time. This does presuppose, however, that the supply source circuit is capable of changing the commutation frequency in dependence on the state of the lamp.

Take-over by the supply source of the supply of current to the lamp occurs immediately after lamp breakdown. The take-over behaviour of the starting circuit often exhibits an undesirable gradient, that is, the supply of current is initiated too slowly, so that the ionization in the lamp is lost and a new ignition pulse is necessary.

SUMMARY OF THE INVENTION

The invention overcomes this drawback, that is, overcomes the demand for current during take-over by providing a circuit arrangement in which a portion of the secondary winding of the pulse transformer is shunted by capacitive means.

A very short, high current peak can occur immediately after breakdown. The invention significantly dampens this current peak so that current flows through the lamp over a longer period, and ionization in the discharge vessel accordingly occurs. This strongly promotes a good take-over behaviour. Advantageously, the circuit formed by the secondary winding of the pulse transformer, the capacitive means, and the lamp connection terminals forms a tuned circuit with which a pulse generated in the pulse generating circuit is converted into an ignition pulse across the connected lamp with only slight losses. Signals of other frequencies, however, are strongly damped in the tuned circuit. The tuning may be chosen to lie at the natural frequency of the pulse generating circuit. Such tuning provides for an efficient coupling-in of the ignition pulse and counteracts failure by semiconductor switches arising from high-frequency signals. The tuning is preferably chosen to lie at or near an even harmonic frequency, in particular the second harmonic of the natural frequency. A further increase in the generated pulse can be achieved without larger components being necessary. Use of a harmonic frequency also results in a further reduction of the pulse generating circuit, in particular, in a smaller pulse transformer.

With the lamp in a stable operational state, the secondary winding forms a negligible impedance and accordingly does not give rise to an appreciable dissipation. This is in contrast to resistive means which are suitable in principle for use as elements of the filter.

Preferably, the secondary winding is built up from a first and a second secondary winding of equal dimensions and applied symmetrically relative to the lamp connection points, each secondary winding being partly shunted by capacitive means. This is particularly favourable as a measure for counteracting the occurrence of interference fields resulting from the pulse generation. The use of a coaxial conductor to a lamp connection point is not necessary for this purpose.

BRIEF DESCRIPTION OF THE DRAWINGS

The above and further aspects of the invention win be explained in more detail with reference to a drawing of an embodiment, in which.

DESCRIPTION OF THE PREFERRED EMBODIMENT

Figure 1:
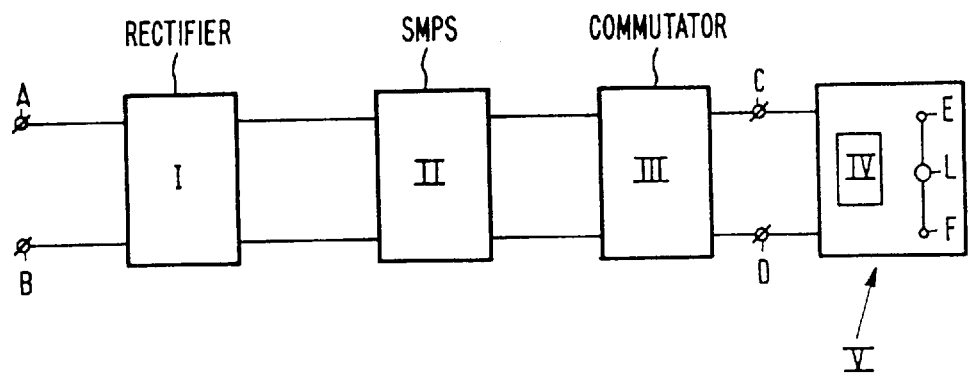
FIG. 1 is a diagram of a circuit for igniting and operating a lamp of a TV system.

In FIG. 1, A,B are connection terminals for connecting a supply voltage source, for example a supply source of 200 to 400 V DC. Filtering takes place in I by means of an input filter. In an alternative embodiment, A and B form connection terminals for connection to a public mains of 220 V, 50 Hz. Rectification of the supply voltage takes place in a rectifier I which includes circuitry for preventing mains voltage distortion arising from operation of the circuit arrangement.

A switch mode power supply (SMPS) II provides a relatively constant voltage to commutator III. Commutator III acts as a commutating supply source with a square-wave supply voltage. Commutator III is connected to a lamp circuit V via input terminals C,D, the lamp circuit comprising a pulse generating circuit IV and lamp connection points E,F between which a lamp L is connected. The lamp circuit V forming part of the circuit of FIG. 1 is depicted in FIG. 2.

Figure 2:
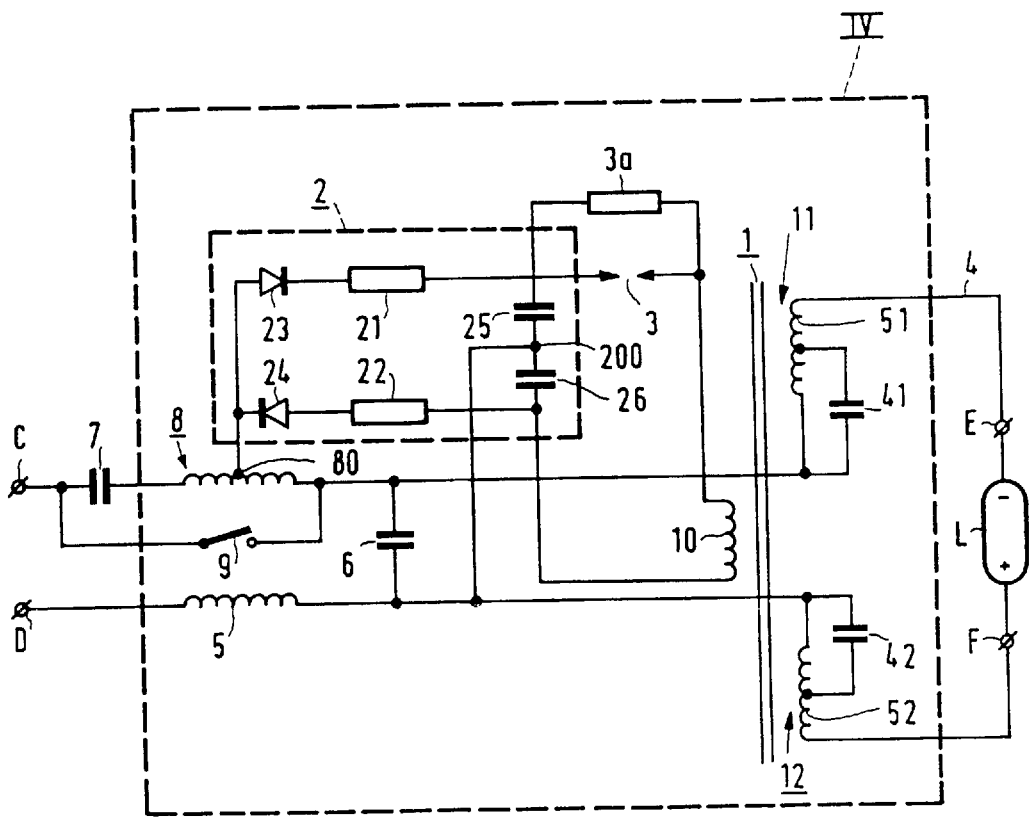
FIG. 2 shows a portion of FIG. 1 which serves for igniting the lamp.

In FIG. 2, input terminal C is connected to a pulse transformer 1. A primary winding 10 of the transformer 1 is connected in series with a voltage-dependent breakdown element 3 between input terminals C and D via a voltage-raising network 2. A first secondary winding 11 of transformer 1 is connected at one end to input terminal C via a series circuit of a decoupling capacitor 7 and a self-inductance 8. On the other hand, First secondary winding 11 is connected at its other end through a conductor 4 to lamp connection point E, thus forming an electrical connection between the secondary winding of the pulse transformer and lamp connection points. First secondary winding 11 is partly shunted by a capacitor 41, that is, by capacitive means. A second secondary winding 12 of transformer 1 is connected in a similar manner at one end to input terminal D via a self-inductance 5 and at its other end to lamp connection point F. Second secondary winding 12 is partly shunted by a capacitor 42, that is, by capacitive means. Self-inductance 5 serves as a protection against excessive inrush currents flowing through the commutator switches.

The voltage-raising network 2 of capacitive, inductive, and rectifying means comprises a first branch with an ohmic impedance 21 and a diode 23. An anode of diode 23 is connected to a tap 80 of self-inductance 8. Ohmic impedance 21 is connected to the voltage-dependent breakdown element 3. The network also comprises a second branch with an ohmic impedance 22 and a diode 24. A cathode of diode 24 is connected to tap 80 of self-inductance 8. Ohmic impedance 22 is connected to the primary winding 10 of pulse transformer 1. The two ohmic impedances 21, 22 are interconnected by a series arrangement of two capacitors 25, 26 of which a common junction point 200 is connected to input terminal D via self-inductance 5. Transformer 1, voltage-raising network 2, and voltage-dependent breakdown element 3, shunted by a leakage resistance 3a, together form a pulse generating circuit IV. Portions 51, 52 of the secondary windings 11, 12 together with the capacitive means 41, 42 form a filter during the ignition phase. This filter also includes the lamp connection points E and F. The tuning of the filter is so chosen in relation to the natural frequency of the pulse generating circuit that the combination forms a band-pass filter for the second harmonic of the natural frequency of the pulse generating circuit, i.e. the circuit formed by capacitors 25, 26 and the primary winding 10 of the pulse transformer 1.

A pair of self-inductances 5 and 8 are interconnected by a capacitor 6, self-inductance 8 and capacitor 6 forming a tuned LC circuit during pulse generation. During pulse generation, the voltage across the capacitive means 25, 26 of the voltage-raising network 2 is increased until the breakdown voltage of the breakdown element 3 is reached by means of a resonant rise in the tuned LC circuit 6, 8.

The decoupling capacitor 7 and the self-inductance 8 are shunted by a controlled switch 9. The switch is open during pulse generation. The moment the commutation frequency switches to a comparatively low value belonging to stable lamp operation, the switch 9 is also closed.

In a practical realisation of an embodiment as described above, the circuit arrangement is suitable for igniting and operating a 100 W Philips high-pressure mercury lamp of the UHP-100 type. The rated lamp voltage is 85 V and the rated lamp current frequency is 180 Hz.

In the practical realisation of the embodiment described here, the circuit arrangement is designed for connection to a supply voltage of 200 to 400 V DC at connection terminals A,B. Rectifier I and SMPS II are an input filter and a downconverter, respectively. The downconverter is provided with a power control such that a voltage of 160 V obtains at the output of the downconverter in the ignition phase and a voltage of 85 V in the stable operational state of the lamp.

Commutator III is constructed as a full bridge circuit. Commutator III supplies a square-wave supply voltage of approximately 160 V in the ignition phase and a square-wave voltage of 85 V in the stable operational state of the lamp.

Lamp ignition proceeds as follows. Since the commutator circuit commutates at a frequency of 60 kHz, a resonant rise of the voltage takes place in the LC circuit 6, 8. This leads to a peak voltage of 800 V at lamp connection points E, F. The two diodes 23, 24 of the voltage-raising network together with the capacitors 25, 26 ensure that the peak voltage of approximately 550 V at the area of tap 80 is increased to a maximum of 1100 V across the capacitors 25, 26. The voltage-dependent breakdown element is a spark gap, made by Siemens, with a breakdown voltage of 800 V which is shunted by a leakage resistance 3a of 10MΩ to achieve a satisfactory operation of the voltage-rising network. This in fact achieves that the voltage across the capacitor of the network is well-defined. This shunt resistance is also desirable for purposes of handling safety. Also for safety reasons, a PTC resistor (not shown) may be included in the connection between the capacitors of the voltage-raising network and the self-inductance 5. The capacitors 25, 26 each have a value of 120 nF, the ohmic impedances 21, 22 of 33 kΩ. The pulse transformer is a high-voltage transformer with a ferrite rod core, a primary winding of 3 turns, and a first and a second secondary winding each comprising 7 sections of 11 turns each. Both the primary winding and the secondary windings are formed from wire of 500 μm diameter. The coupling between primary and secondary windings here is 0.7. The coupling between the two secondary windings mutually is 0.9. The transformer has a leakage self-inductance of 364 μH measured at the secondary windings with the primary winding short circuited. Each of the secondary windings is shunted across 3 sections by a capacitor of 220 pF.

Figure 3A:
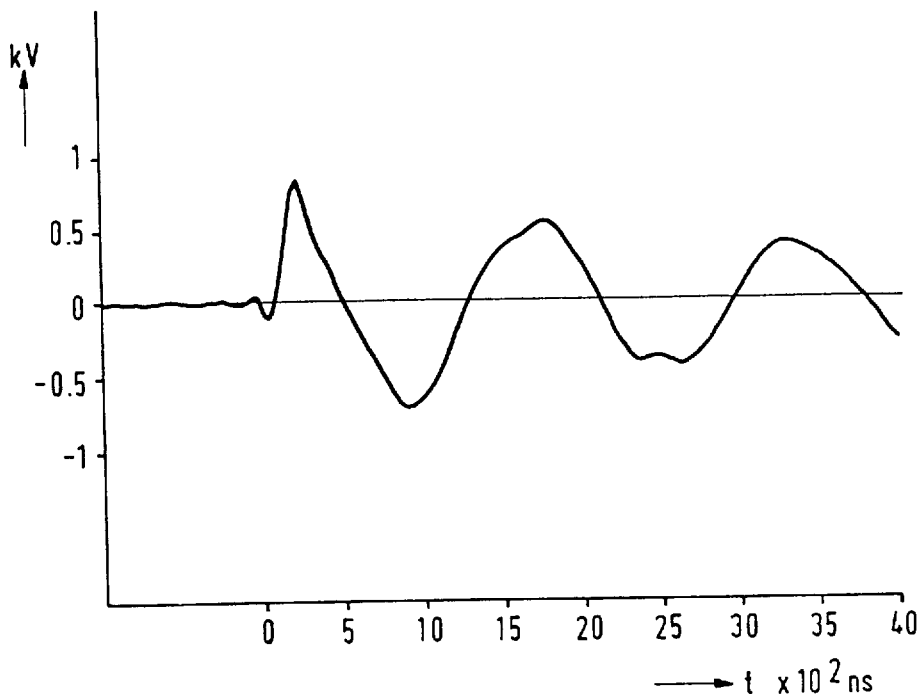
FIGS. 3A and 3B show the voltages generated by the circuit arrangement of FIGS. 1 and 2.

The pulse thus generated has a value of approximately 20 kV. The generated ignition pulse is pictured in FIGS. 3A and 3B. FIG. 3A shows the voltage pulse at the primary winding of pulse transformer 1, and FIG. 3B the voltage pulse at the secondary winding of the pulse transformer 1. Time t is plotted on the horizontal axis in units of 500 ns per graduation. The voltage V is plotted on the vertical axis in kV.

Figure 3B:
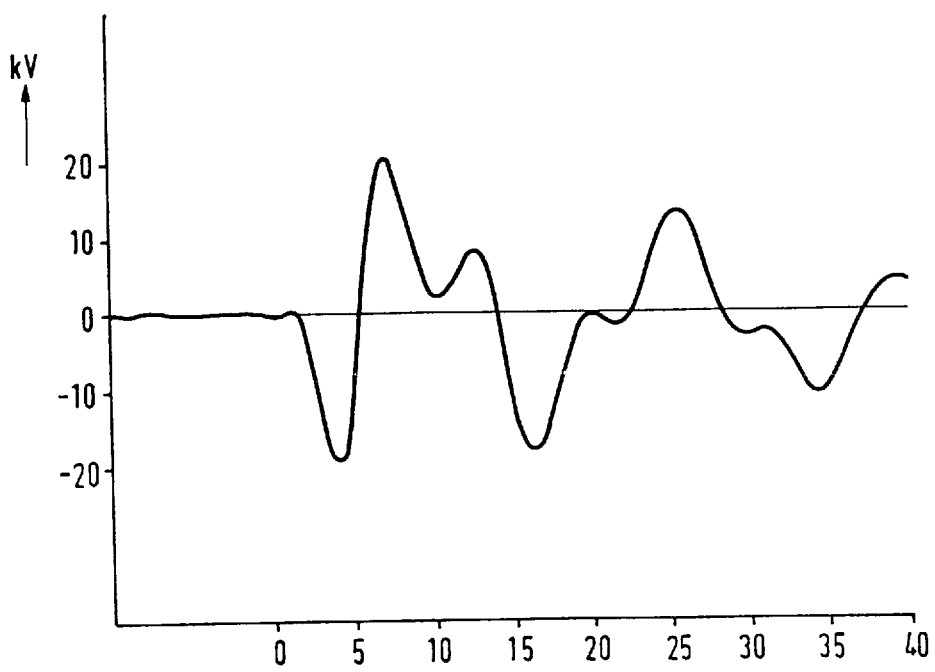

It is evident from FIG. 3B that the generated pulse has a width b of 200 ns at a pulse level of 10 kV. The pulse in FIG. 3A has a frequency of 1 MHz. The pulse in FIG. 3B has a frequency of 2 MHz.

The generated pulse leads to breakdown in a lamp which has not yet ignited. After the breakdown of the lamp, the latter starts its run-up and reaches the stable operational state after some time. This is found to occur after approximately 700 ms in the lamp described, after which the lamp voltage rises further to the rated value. After a period of 1 s after breakdown across the lamp, the commutation frequency of the commutator circuit is reduced to 180 Hz, and the lamp has reached its nominal operational state.

In the case of a lamp which has extinguished, but not yet cooled down, the generated pulse causes hot re-ignition within 30 s.

Although in the embodiment described the voltage-raising network is connected to a tap of the self-inductance 80, it is equally well possible to situate this connection between the self-inductance 8 and capacitor 6.

The values chosen shunt capacitors 41, 42 is not critical. The values chosen preferably lie between 150 pF and 400 pF for each capacitor. A higher value within the range will generally lead to a quicker hot re-ignition. Capacitance values outside the range result in a reduced pulse height.

The values of the capacitive means (i.e. capacitors 41, 42) conform to the following relation:

$$2.2 < n^2 C_s/C_p < 8.8$$

where:

n is the winding ratio of the pulse transformer, $C_s$ is the value of the capacitive means shunting the associated secondary winding of the pulse transformer, and $C_p$ the total capacitance value of the pulse generating circuit.

It will thus be seen that the objects set forth above and those made apparent from the preceding description are efficiently attained, and since certain changes can be made in the above method and construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which as a matter of language, might be said to fall therebetween.

We claim:

1. A circuit arrangement for igniting a high pressure discharge lamp, comprising:

a pulse generating circuit having a natural frequency and including a voltage-dependent breakdown element;

a pulse transformer coupled to the pulse generating circuit and having a secondary winding;

lamp connection points; and an electrical connection between the secondary winding of the pulse transformer and the lamp connection points characterized in that a portion of the secondary winding of the pulse transformer is shunted by capacitive means and in that the secondary winding of the pulse transformer and the lamp connection points form part of a tuned circuit tuned at or near an even harmonic of the natural frequency of the pulse generating circuit.

2. The circuit arrangement as claimed in claim 1, characterized in that the secondary winding includes a first winding and a second winding.

3. A circuit arrangement for igniting a high pressure discharge lamp, comprising:

a pulse generating circuit having a natural frequency and including a voltage-dependent breakdown element;

a pulse transformer coupled to the pulse generating circuit and having a secondary winding formed from a first winding and a second winding;

lamp connection points; and an electrical connection between the secondary winding of the pulse transformer and the lamp connection points characterized in that a portion of the secondary winding of the pulse transformer is shunted by capacitive means and in that the first and second windings have equal dimensions and are symmetrical to the lamp connection points, the first and second windings each being partly shunted by the capacitive means.

4. A circuit arrangement for igniting a high pressure discharge lamp, comprising:

a pulse generating circuit having a natural frequency and including a voltage-dependent breakdown element;

a pulse transformer coupled to the pulse generating circuit and having a secondary winding formed from a first winding and a second winding;

lamp connection points; and an electrical connection between the secondary winding of the pulse transformer and the lamp connection points characterized in that a portion of the first winding and a portion of the second winding are each shunted by capacitive means.

5. The circuit arrangement as claimed in claim 4, wherein the capacitive means includes a first capacitor which shunts a portion of the first winding and a second capacitor which shunts a portion of the second winding, the first capacitor and the second capacitor each conforming to the following relation:

$$2.2 \text{ is less than } n^2 C_s/C_p \text{ which is less than } 8.8$$

wherein n is the winding ratio of the pulse transformer, $C_s$ is the capacitance of the first capacitor or the second capacitor and $C_p$ is the total capacitance of the pulse generating circuit.

6. The circuit arrangement as claimed in claim 4, further comprising a filter which includes the secondary winding and capacitive means and tuned to about an even harmonic of the natural frequency.

7. The circuit arrangement as claimed in claim 6, wherein the filter is tuned to the second harmonic of the natural frequency.

8. A method for igniting a high pressure discharge lamp comprising the steps of:

generating at least one pulse from a pulse transformer, each pulse having a natural frequency;

tuning a filter formed from a portion of a secondary winding of the pulse transformer to about the second harmonic of the natural frequency wherein the step of tuning includes capacitively shunting the portion of the secondary winding; and applying the at least one pulse tuned by the filter to the high pressure discharge lamp during ignition.

9. The method as claimed in 8, wherein the step of tuning further includes forming the secondary winding into a first winding and a second winding with a first capacitor shunting a portion of the first winding and a second capacitor shunting a portion of the second winding, the first capacitor and the second capacitor each conforming to the following relation:

$$2.2 \text{ is less than } n^2 C_s/C_p \text{ which is less than } 8.8$$

wherein n is the winding ratio of the pulse transformer, $C_s$ is the capacitance of the first capacitor or the second capacitor and $C_p$ is the total capacitance of the pulse generating circuit.

* * * * *